(12) United States Patent
Yabu

(10) Patent No.: US 9,148,610 B2
(45) Date of Patent: Sep. 29, 2015

(54) VIDEO RECEPTION DEVICE AND IMAGE RECOGNITION METHOD FOR RECEIVED VIDEO

(71) Applicant: Panasonic Corporation, Osaka (JP)

(72) Inventor: Hiroshi Yabu, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/958,863

(22) Filed: Aug. 5, 2013

(65) Prior Publication Data

US 2014/0293130 A1    Oct. 2, 2014

(30) Foreign Application Priority Data

Mar. 26, 2013  (JP) .................................. 2013-065190

(51) Int. Cl.
*H04N 5/44*      (2011.01)
*H04N 5/445*     (2011.01)
*H04N 21/431*    (2011.01)
*H04N 21/44*     (2011.01)
*H04N 21/442*    (2011.01)
*H04N 21/4722*   (2011.01)
*H04N 21/488*    (2011.01)
*H04N 21/8352*   (2011.01)

(52) U.S. Cl.
CPC ......... *H04N 5/4403* (2013.01); *H04N 5/44513* (2013.01); *H04N 5/44591* (2013.01); *H04N 21/4312* (2013.01); *H04N 21/44008* (2013.01); *H04N 21/44222* (2013.01); *H04N 21/4722* (2013.01); *H04N 21/488* (2013.01); *H04N 21/8352* (2013.01); *H04N 2005/44521* (2013.01)

(58) Field of Classification Search
CPC .................................................... H04N 5/4403
USPC ........... 348/725, 552, 553; 386/241; 382/182, 382/276, 103
See application file for complete search history.

(56) References Cited

U.S. PATENT DOCUMENTS 7,712,123 B2     5/2010  Miyaoku et al.
8,199,221 B2 *   6/2012  Yoshizumi ............... 348/231.99
8,254,720 B2 *   8/2012  Matsuzaki ..................... 382/276
8,582,952 B2 *  11/2013  Circlaeys et al. ............. 386/241

(Continued)

FOREIGN PATENT DOCUMENTS

EP       1 954 041      8/2008
JP       10-214258      8/1998

(Continued)

*Primary Examiner* — Paulos M Natnael
(74) *Attorney, Agent, or Firm* — Wenderoth, Lind & Ponack, L.L.P.

(57) ABSTRACT

A video reception device connected to an image recognition device for performing image recognition includes: a video input unit that receives a video including content items switches of which occur as time elapses; a video extraction unit that extracts from the video a partial video which is a portion of the video; a content switchover detection unit that detects whether or not the partial video includes content switchover indicating switchover of the content items; and a control unit that performs, when the content switchover detection unit detects that the partial video includes no content switchover, a control to output the partial video to the image recognition device to obtain a result of the image recognition for the partial video from the image recognition device.

9 Claims, 14 Drawing Sheets

(56) References Cited

U.S. PATENT DOCUMENTS

| | | | |
|---|---|---|---|
| 2003/0051252 A1 | 3/2003 | Miyaoku et al. | |
| 2007/0233285 A1* | 10/2007 | Yamamoto | 700/28 |
| 2009/0006375 A1* | 1/2009 | Lax et al. | 707/5 |
| 2009/0034937 A1 | 2/2009 | Kusunoki et al. | |
| 2009/0177758 A1* | 7/2009 | Banger et al. | 709/219 |
| 2009/0279738 A1* | 11/2009 | Sasaki | 382/103 |
| 2011/0078202 A1 | 3/2011 | Kamibeppu | |
| 2012/0092248 A1* | 4/2012 | Prabhala | 345/156 |
| 2013/0054645 A1* | 2/2013 | Bhagavathy et al. | 707/780 |
| 2013/0129219 A1* | 5/2013 | Takenouchi et al. | 382/182 |
| 2013/0167189 A1* | 6/2013 | Lucas | 725/131 |
| 2013/0247117 A1* | 9/2013 | Yamada et al. | 725/93 |
| 2013/0254802 A1* | 9/2013 | Lax et al. | 725/34 |

FOREIGN PATENT DOCUMENTS

| | | |
|---|---|---|
| JP | 2002-209204 | 7/2002 |
| JP | 2007-49515 | 2/2007 |
| JP | 2012-055013 | 3/2012 |
| WO | 2007/039994 | 4/2007 |
| WO | 2009/011030 | 1/2009 |

* cited by examiner

FIG. 8

| Before operation \ After operation | | Ground wave | | External input 1 | | External input 2 | |
|---|---|---|---|---|---|---|---|
| | | Program | Ad | Program | Ad | Program | Ad |
| Ground wave | Program | (Channel (CH) switchover in ground wave)<br>Operation detection: Detectable<br>Video detection: Unnecessary | (From program to ad within same CH)<br>Operation detection: Undetectable<br>Video detection: Necessary | (Input switchover from ground wave to external 1)<br>Operation detection: Detectable<br>Video detection: Unnecessary | (Input switchover from ground wave to external 1)<br>Operation detection: Detectable<br>Video detection: Unnecessary | (Input switchover from ground wave to external 2)<br>Operation detection: Detectable<br>Video detection: Unnecessary | (Input switchover from ground wave to external 2)<br>Operation detection: Detectable<br>Video detection: Unnecessary |
| | Ad | (From ad to program within same CH)<br>Operation detection: Undetectable<br>Video detection: Necessary | (From ad to ad within same CH)<br>Operation detection: Undetectable<br>Video detection: Necessary | (Input switchover from ground wave to external 1)<br>Operation detection: Detectable<br>Video detection: Unnecessary | (Input switchover from ground wave to external 1)<br>Operation detection: Detectable<br>Video detection: Unnecessary | (Input switchover from ground wave to external 2)<br>Operation detection: Detectable<br>Video detection: Unnecessary | (Input switchover from ground wave to external 2)<br>Operation detection: Detectable<br>Video detection: Unnecessary |
| External input 1 | Program | (Input switchover from external 1 to ground wave)<br>Operation detection: Detectable<br>Video detection: Unnecessary | (Input switchover from external 1 to ground wave)<br>Operation detection: Detectable<br>Video detection: Unnecessary | (CH switchover in external 1)<br>Operation detection: Undetectable<br>Video detection: Necessary | (From program to ad within same CH in external 1)<br>Operation detection: Undetectable<br>Video detection: Necessary | (Input switchover from external 1 to external 2)<br>Operation detection: Detectable<br>Video detection: Unnecessary | (Input switchover from external 1 to external 2)<br>Operation detection: Detectable<br>Video detection: Unnecessary |
| | Ad | (Input switchover from external 1 to ground wave)<br>Operation detection: Detectable<br>Video detection: Unnecessary | (Input switchover from external 1 to ground wave)<br>Operation detection: Detectable<br>Video detection: Unnecessary | (From ad to program within same CH in external 1)<br>Operation detection: Undetectable<br>Video detection: Necessary | (From ad to ad within same CH in external 1)<br>Operation detection: Undetectable<br>Video detection: Necessary | (Input switchover from external 1 to external 2)<br>Operation detection: Detectable<br>Video detection: Unnecessary | (Input switchover from external 1 to external 2)<br>Operation detection: Detectable<br>Video detection: Unnecessary |
| External input 2 | Program | (Input switchover from external 2 to ground wave)<br>Operation detection: Detectable<br>Video detection: Unnecessary | (Input switchover from external 2 to ground wave)<br>Operation detection: Detectable<br>Video detection: Unnecessary | (Input switchover from external 2 to external 1)<br>Operation detection: Detectable<br>Video detection: Unnecessary | (Input switchover from external 2 to external 1)<br>Operation detection: Detectable<br>Video detection: Unnecessary | (CH switchover in external 2)<br>Operation detection: Undetectable<br>Video detection: Necessary | (From program to ad within same CH in external 2)<br>Operation detection: Undetectable<br>Video detection: Necessary |
| | Ad | (Input switchover from external 2 to ground wave)<br>Operation detection: Detectable<br>Video detection: Unnecessary | (Input switchover from external 2 to ground wave)<br>Operation detection: Detectable<br>Video detection: Unnecessary | (Input switchover from external 2 to external 1)<br>Operation detection: Detectable<br>Video detection: Unnecessary | (Input switchover from external 2 to external 1)<br>Operation detection: Detectable<br>Video detection: Unnecessary | (From ad to program within same CH in external 2)<br>Operation detection: Undetectable<br>Video detection: Necessary | (From ad to ad within same CH in external 2)<br>Operation detection: Undetectable<br>Video detection: Necessary |

FIG. 9

| Factor of content switchover | Detection method | | Detection target |
|---|---|---|---|
| Content switchover in broadcasting (network) such as switchover of program(s)/ad(s) | Change in content attribute | Use of program meta-information | EPG information of broadcast data and meta-information obtained from cloud server |
| | | Change in signal attribute information | Copyright, free/charge, scramble/descramble, and viewing restriction |
| | | Change in attribute of video and audio | Image resolution, aspect, 2D/3D, the number of audio channels, sampling frequency, the number of streams |
| Content switchover (between networks) by broadcast switching such as remote control operation | Detection of switching signal | | Channel switchover, switchover of input media (external input, the Internet, and storage), existence/nonexistence of GUI (operation panel) display, and particular reproduction (such as fast-forward) |
| | Detection of presence of source | | Recognition/non-recognition of HDMI, video sink, antenna reception level, stream error, video black mute, and audio mute |

VIDEO RECEPTION DEVICE AND IMAGE RECOGNITION METHOD FOR RECEIVED VIDEO

CROSS REFERENCE TO RELATED APPLICATION

The present application is based on and claims priority of Japanese Patent Application No. 2013-065190 filed on Mar. 26, 2013. The entire disclosure of the above-identified application, including the specification, drawings and claims is incorporated herein by reference in its entirety.

FIELD

The present disclosure relates generally to video reception devices and image recognition methods for a received video and, in particular, to a video reception device for outputting a received video to an external image recognition device to obtain an image recognition result.

BACKGROUND

In recent years, with the widespread use of a communication network and the advancement of the computer technology, a technique has been suggested in which a client device transmits an image to a server (i.e., an image recognition device) and requests image recognition to obtain and utilize an image recognition result from the server (e.g., Patent Literature 1). Moreover, a service (such as Google Goggles of Google inc.) using such image recognition technique is becoming popular.

CITATION LIST

Patent Literature

[PTL 1] Japanese Unexamined Patent Application Publication No. 10-214258

SUMMARY

Technical Problem

When a service using such image recognition technique is applied to a video reception device such as a TV (television receiver), the following processing is considered to be performed. The video reception device regularly clips (extracts) a part of content (a partial video) from a received video, and transmits to a server, so that the server performs image recognition for the partial video.

However, when a partial video is regularly extracted and the image recognition is repeated, and, for example, receive channels of the TV have been changed, the switchover of content items (hereinafter referred to as "content switchover") may be included in an extracted partial video. In this case, since at least two content items are included in one partial video, the server may fail in the image recognition for the partial video.

One non-limiting and exemplary embodiment provides a video reception device and others which allow for more reliable image recognition for content even when content items in a received video change.

Solution to Problem

In one general aspect, the techniques disclosed here feature a video reception device connected to an image recognition device for performing image recognition, the video reception device including: a video input unit that receives a video including content items switches of which occur as time elapses; a video extraction unit that extracts from the video a partial video which is a portion of the video; a content switchover detection unit that detects whether or not the partial video includes content switchover indicating switchover of the content items; and a control unit that performs, when the content switchover detection unit detects that the partial video includes no content switchover, a control to output the partial video to the image recognition device to obtain a result of the image recognition for the partial video from the image recognition device.

It should be noted that the present disclosure can be achieved as (i) an image recognition method for a video received by a video reception device connected to an image recognition device for performing image recognition, (ii) a program for causing a computer to execute the procedure of the image recognition method, and (iii) a computer-readable recording medium such as DVDs storing such a program.

Advantageous Effects

Video reception devices and others in the present disclosure allow for more reliable image recognition for content even when content items in a received video change.

This allows for stable image recognition for a video received by a TV or the like, and broadens a possibility for various applications using a recognition result. Now that video reception devices using a communication network such as Internet TVs are in widespread use, the present disclosure has a significant meaning.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a figure to categorize detection methods in terms of (i) a path for obtaining a video signal before the content switchover by the content switchover detection unit and (ii) a path for obtaining a video signal after the content switchover by the content switchover detection unit.

FIG. 9 is a figure to explain the specific content of a detection method by the content switchover detection unit.

DESCRIPTION OF EMBODIMENT

Embodiment 1

The following describes the embodiment of video reception devices and image recognition methods in the present disclosure with reference to drawings. It should be noted that the drawings are schematic views and not necessarily exactly-illustrated drawings.

Moreover, the embodiment described below illustrates a specific example of video reception devices and image recognition methods for a received video in the present disclosure. Numerical values, structural elements, the arrangement and connection of the structural elements, and so on shown in the following embodiment are mere examples, and are not intended to limit the video reception devices and the image recognition methods for a received video in the present disclosure. Among structural elements in the following embodiment, structural elements not recited in the independent claims are described as arbitrary structural elements.

[System Configuration]

Figure 1:
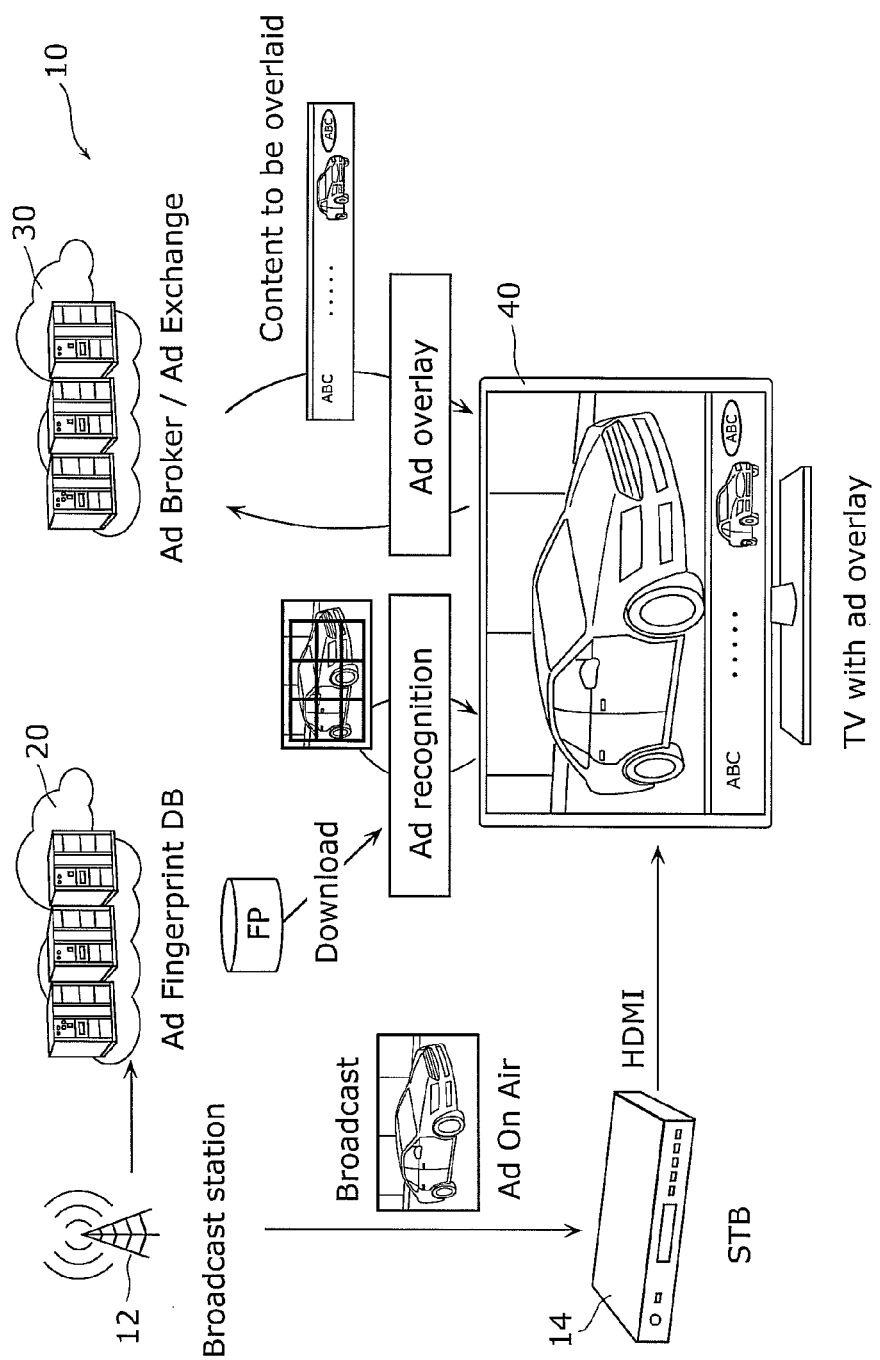
FIG. 1 illustrates a configuration of a content recognition system including a video reception device in the embodiment.

FIG. 1 illustrates a configuration of a content recognition system 10 including a video reception device in the embodiment of the present disclosure.

The content recognition system 10 is a communication system which allows a video reception device 40 to display an advertisement (ad) relating to a video received by the video reception device 40 such as a TV, using image recognition by an external device. The content recognition system 10 includes a broadcast station 12, a set top box (STB) 14, an image recognition device 20, a communication device 30 which is an advertisement website, and the video reception device 40.

The broadcast station 12 is a transmission device for broadcasting, as video signals, content items switches of which occur as time elapses and which include a TV program and a TV commercial (ad).

The STB 14 is a tuner decoder for TV broadcasting which decodes content items tuned based on user's instruction from among video signals transmitted from the broadcast station 12, and outputs to the video reception device 40 via a communication channel. Here, the communication channel is a high-definition multimedia interface (HDMI, registered trademark).

The image recognition device 20 is a website (server device) for analyzing a content item broadcasted from the broadcast station 12 and providing an image recognition service using the analysis result. Here, all the content items broadcasted from the broadcast station 12 are received by the image recognition device 20. Immediately after that, the received content items are, for example, manually analyzed, and the analysis results (content of content items and information on characters) are registered in a memory device of the image recognition device 20. When receiving a request for image recognition along with a partial video from the video reception device 40, the image recognition device 20 (i) matches the partial video and an image registered in the memory device to identify a content item that matches the partial video transmitted from the video reception device 40, (ii) reads an analysis result registered relating to the identified content item from the memory device, and (iii) sends the analysis result to the video reception device 40 as an image recognition result. The image matching here is performed using the fingerprint technology, for example.

The communication device 30 is a website for distributing information relating to image recognition results obtained from the image recognition device 20 by the video reception device 40. Here, the communication device 30 is an ad distribution website for storing and distributing the ads of various products.

The video reception device 40 is a video reception device such as a TV (television receiver) connected to the image recognition device 20 and the communication device 30 via a communication network. The video reception device 40 clips (extracts) a partial video from a received video and transmits to the image recognition device 20, so that the video reception device 40 obtains an image recognition result for the partial video from the image recognition device 20, and obtains the ad relating to the obtained image recognition result from the communication device 30 to display on the screen. Thus, the ad relating to the received video is displayed along with the video in real time.

Figure 2:
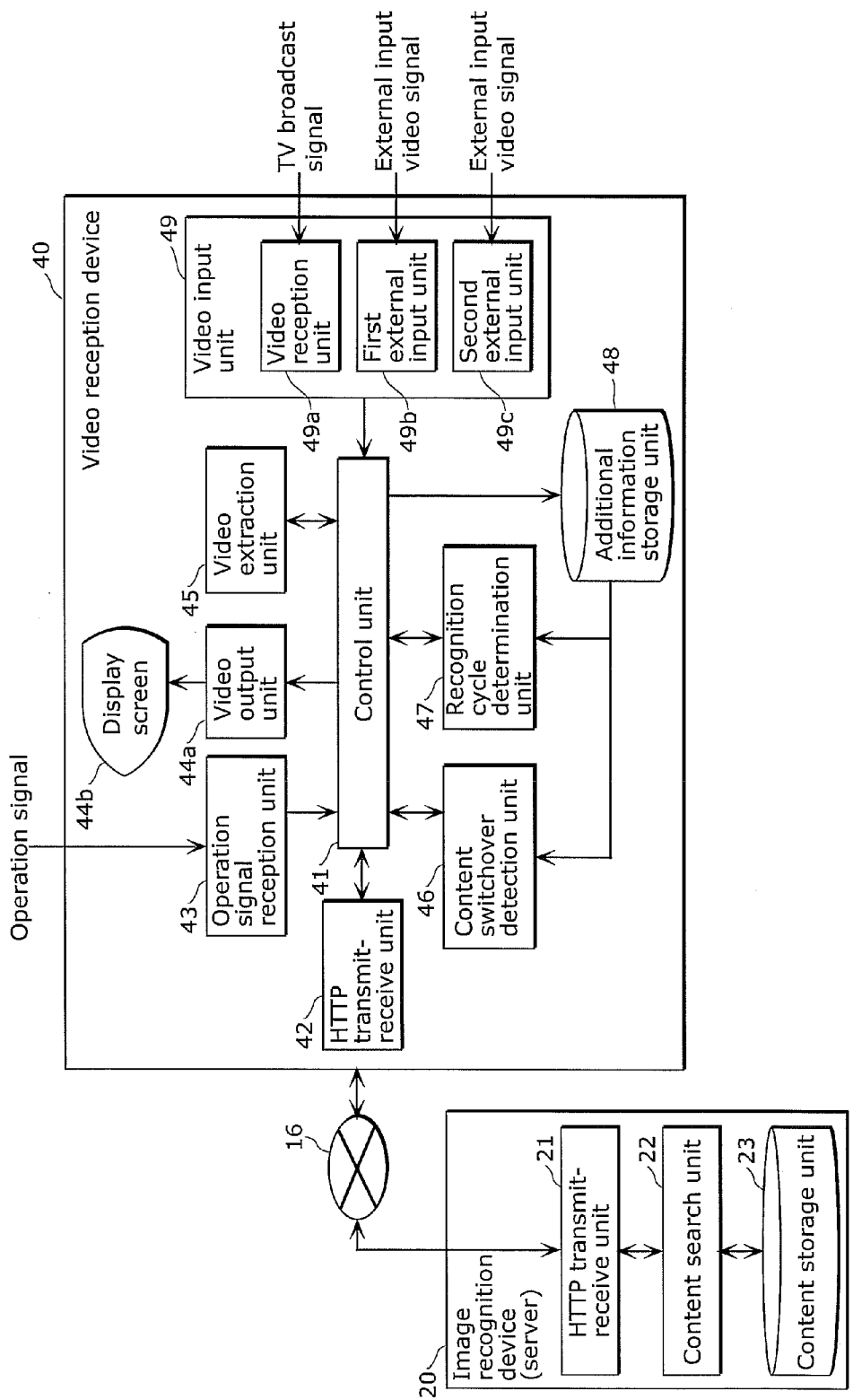
FIG. 2 is a block diagram illustrating a configuration of the image recognition device and the video reception device in FIG. 1.

FIG. 2 is a block diagram illustrating a configuration of the image recognition device 20 and the video reception device 40 shown in FIG. 1.

The image recognition device 20 is a server for providing an image recognition service for the video reception device 40 via a communication network 16. The image recognition device 20 includes a hyper text transfer protocol (HTTP) transmit-receive unit 21, a content search unit 22, and a content storage unit 23.

The HTTP transmit-receive unit 21 is an interface for communicating with the video reception device 40 via the communication network 16. For example, the HTTP transmit-receive unit 21 is a communication adapter for a wired LAN adaptable to IEEE802.3 specification.

The content storage unit 23 is a storage device for storing, in an associated manner for a each content item, (i) the fingerprint (e.g., hash values of pictures forming a video) of a content item broadcasted from the broadcast station 12 and (ii) an analysis result for the content item. For example, the content storage unit 23 is a computer or the like having a hard disk drive (HDD). For example, the content storage unit 23 stores, in an associated manner for each content item, fingerprints and analysis results (such as programs, titles of ads, outlines of programs and ads, characters, locations relating to videos) for all channels (e.g., 300 channels) broadcasted from the broadcast station 12, with a short delay from the broadcast (e.g., 10 seconds).

When receiving a request for image recognition along with a partial video from the video reception device 40 via the HTTP transmit-receive unit 21, the content search unit 22 functions as an image recognition processing unit which is a processing unit for performing the image recognition for the partial video and sending the result to the video reception device 40 via the HTTP transmit-receive unit 21. Therefore, when receiving a request for the image recognition along with a partial video from the video reception device 40, the content search unit 22 creates a fingerprint for the partial video and makes a search by matching the fingerprint and a fingerprint stored in the content storage unit 23 to identify the content item to which the partial video belongs. Then, the content search unit 22 reads the analysis result associated with the identified content item from the content storage unit 23, and sends, as an image recognition result, to the video reception device 40 via the HTTP transmit-receive unit 21.

The video reception device 40 is a device for displaying in real time a received video and information relating to the video (here, ad) by using the image recognition. The video reception device 40 includes a control unit 41, the HTTP transmit-receive unit 42, an operation signal reception unit 43, a video output unit 44a, a display screen 44b, a video extraction unit 45, a content switchover detection unit 46, a recognition cycle determination unit 47, an additional information storage unit 48, and a video input unit 49.

The HTTP transmit-receive unit 42 is an interface for communicating with the video reception device 20 via the communication network 16. For example, the HTTP transmit-receive unit 42 is a communication adapter for a wired LAN adaptable to IEEE802.3 specification.

The operation signal reception unit 43 is a circuit for receiving operation signals indicating user operation for the video reception device 40, from an operation unit such as a remote control. It should be noted that the operation signal reception unit 43 may further receive information on physical behavior of the remote control or the like from the remote control or the like having a gyro sensor.

The video input unit 49 is, for example, a reception circuit and a decoder for tuning and receiving a video including content items (i.e., program and ad) switches of which occur as time elapses, in accordance with an operation signal received by the operation signal reception unit 43. The video input unit 49 includes a video reception unit 49a, a first external input unit 49b, and a second external input unit 49c. The video reception unit 49a is a circuit for receiving video signals (TV broadcast signals) transmitted from antennas, for example. The first external input unit 49b and the second external input unit 49c are interfaces for receiving video signals (external input video signals) from external devices such as the STB 14 and a video record playback device.

The video output unit 44a is a display control circuit for outputting a video received by the video input unit 49 to the display screen 44b.

The display screen 44b is a display such as a plasma display panel (PDP) or a liquid crystal display (LCD).

The recognition cycle determination unit 47 is a processing unit for determining a cycle for repeating the image recognition for a video received by the video input unit 49. For example, the recognition cycle determination unit 47 selects any one of 13 types of cycles in total ranging from three seconds to four seconds to 15 seconds. Here, the recognition cycle determination unit 47 determines a possibility that the content switchover which is switchover of content items has been or will be found in a video received by the video input unit 49. When determining that there is such a possibility, the recognition cycle determination unit 47 shortens the image recognition cycle (it should be noted that when the cycle is the shortest cycle, the cycle remains the same). On the other hand, when determining that there is no such possibility, the image recognition cycle is extended (it should be noted that when the cycle is the longest cycle, the cycle remains the same).

Figure 3:
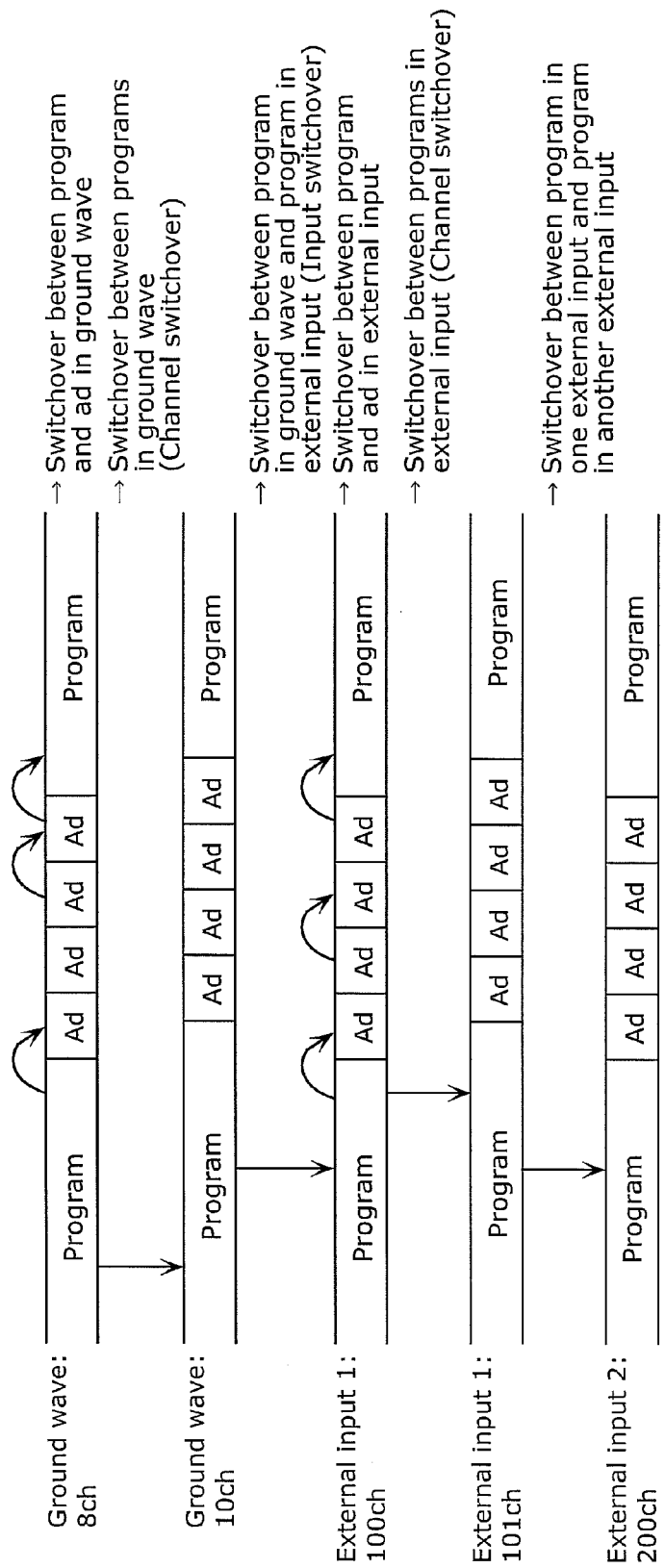
FIG. 3 is a figure to explain the meaning of "content switchover".

It should be noted that the "content switchover" means, as shown in the arrows in FIG. 3, a switchover from a program to an ad, a switchover from an ad to another ad, a switchover from an ad to a program, and a switchover from a program to another program, for example. It should be noted that the switchover from a program to another program includes, as shown in FIG. 3, a switchover of ground wave programs, a switchover of a ground wave program and an external input program, and a switchover of external input programs.

The video extraction unit 45 is a processing unit for extracting, from a video received by the video input unit 49, a partial video which is a portion of the video, at a cycle determined by the recognition cycle determination unit 47. Here, the video extraction unit 45 clips a video of a predetermined time cycle (e.g., three seconds) at the cycle determined by the recognition cycle determination unit 47. Therefore, for example, when the cycle determined by the recognition cycle determination unit 47 is three seconds, the video extraction unit 45 repeatedly extracts a partial video of three seconds once every three seconds (i.e., clips partial videos of three seconds without any time interval), or when the cycle determined by the recognition cycle determination unit 47 is 15 seconds, the video extraction unit 45 repeatedly extracts a partial video of three seconds once every 15 seconds (i.e., clips partial videos of three seconds with 12-second time intervals).

The content switchover detection unit 46 is a processing unit for detecting whether or not the content switchover which is switchover of content items is included in a partial video extracted by the video extraction unit 45. More specifically, the content switchover detection unit 46 detects whether or not the content switchover is included in the video based on at least one of (i) the attribute of content in the partial video extracted by the video extraction unit 45 and (ii) user's instruction (i.e., an operation signal received by the operation signal reception unit 43).

The additional information storage unit 48 is a memory device for storing program meta-information such as EPG received by the video input unit 49, and is, for example, a nonvolatile memory.

The control unit 41 is a processing unit for controlling each structural element included in the video reception device 40. The control unit 41 includes a nonvolatile memory such as a ROM storing a program (such as an application program), a CPU for executing the program, and a volatile memory such as a RAM, as a temporary work space when the CPU is executing the program.

As one of the control, every time a partial video is extracted by the video extraction unit 45, the control unit 41 performs the control to output the extracted partial video to the image recognition device 20 to obtain an image recognition result for the partial video from the image recognition device 20. Here, when the content switchover detection unit 46 detects that the partial video does not include the content switchover, the control unit 41 outputs the partial video to the image recognition device 20 to obtain an image recognition result for the partial video from the image recognition device 20. When receiving the image recognition result from the image recognition device 20, the control unit 41 obtains related information which is information relating to the image recognition result (here, ad) from the communication device 30 via the communication network 16, and allows the video output unit 44a to cause the display screen 44b to display the obtained related information (here, ad).

The following two points are the characteristic functions of the content recognition system 10 in the present embodiment configured as above.

(1) Selective Image Recognition

A first characteristic is that the control unit 41 of the video reception device 40 causes the image recognition device 20 to perform the image recognition only for a partial video which the content switchover detection unit 46 detects as a partial video which does not include the content switchover, among partial videos successively extracted by the video extraction unit 45. That is, the control unit 41 prevents the image recognition device 20 from performing the image recognition for a partial video including the content switchover. This avoids (i)

the failure of the image recognition due to the fact that at least two content items are included in a partial video and (ii) unnecessary processing in the video reception device 40.

(2) Cycle for Image Recognition is Variable

A second characteristic is explained as below. The recognition cycle determination unit 47 of the video reception device 40 determines a possibility that the content switchover which is switchover of content items has been or will be found in a video received by the video input unit 49. When there is such a possibility, the recognition cycle determination unit 47 shortens a cycle for the image recognition. When there is no such possibility, the recognition cycle determination unit 47 extends the cycle for the image recognition. This not only reduces the processing load of the video reception device 40 when performing the image recognition, but also increases the possibility that the timing of the image recognition is automatically adjusted and the image recognition is performed for each content item.

It should be noted that the two characteristic functions do not necessarily have to function at the same time but one of the functions may function. That is, the video reception device 40 does not have to include both of the content switchover detection unit 46 and the recognition cycle determination unit 47, but may include at least one of these units. Such selection of the functions is, for example, determined by a user presetting the video reception device 40. Moreover, when the video reception device 40 does not include the recognition cycle determination unit 47, the video reception device 40 repeats the image recognition at a predetermined (fixed) cycle or a variable cycle set by the user.

[System Operation]

The following describes the operations of characteristic functions of the content recognition system 10 in the present embodiment.

(1) Operation of Selective Image Recognition

The following describes the operation of selective image recognition by the video reception device 40 in the content recognition system 10.

Figure 4A:
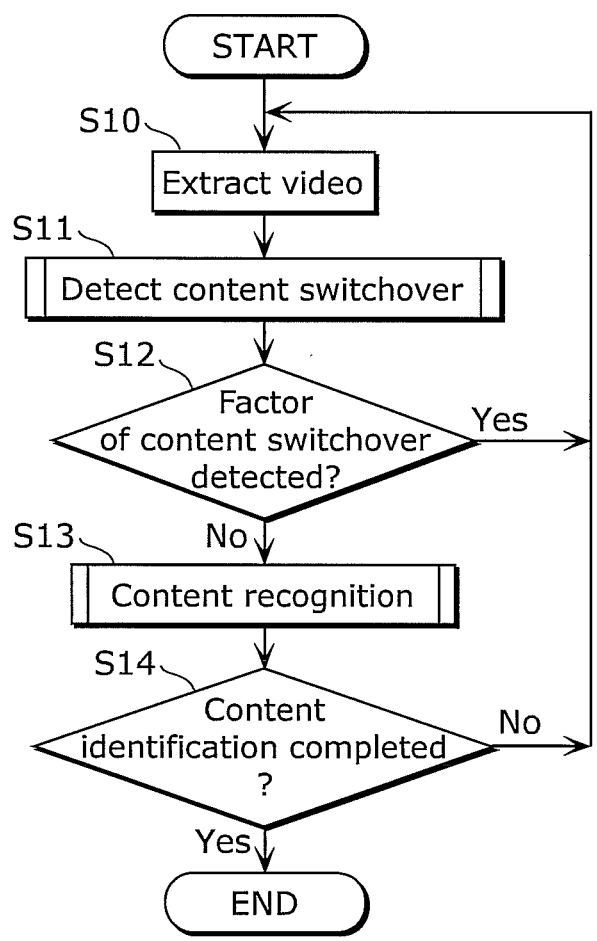
FIG. 4A is a flowchart illustrating the procedure of selective image recognition by the video reception device.
Figure 5:
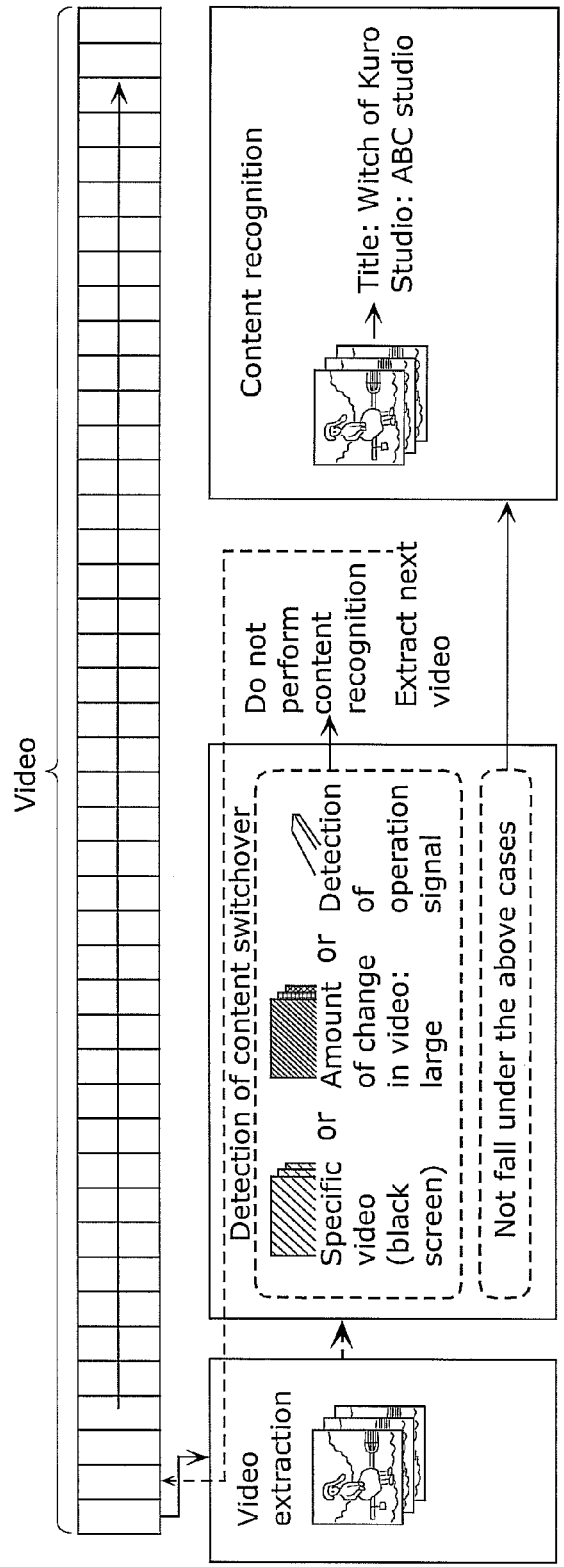
FIG. 5 is a figure to explain the overview of selective image recognition by the video reception device.

FIG. 4A is a flowchart illustrating the procedure of the selective image recognition by the video reception device 40 in the content recognition system 10. FIG. 5 is a figure to explain the overview of such selective image recognition by the video reception device 40.

The video extraction unit 45 extracts, from a video received by the video input unit 49, a partial video which is a portion of the video, at a cycle determined by the recognition cycle determination unit 47 or a predetermined cycle (step S10, "video extraction" in FIG. 5). For example, the video extraction unit 45 extracts the partial video of three seconds once every 15 seconds.

The content switchover detection unit 46 detects the content switchover (step S11, "detection of content switchover" in FIG. 5). That is, the content switchover detection unit 46 detects whether or not the content switchover is included in a partial video extracted by the video extraction unit 45.

As a result, when it is determined that the partial video includes the content switchover (Yes in the step S12), the control unit 41 causes the video extraction unit 45 to extract the next partial video (i.e., re-extract) without performing the image recognition for the partial video. It should be noted that without waiting for a cycle determined by the recognition cycle determination unit 47, the control unit 41 causes the video extraction unit 45 to perform the re-extraction immediately after the above determination.

On the other hand, when it is determined that the partial video does not to include the content switchover (No in the step S12), the control unit 41 causes the image recognition device 20 to perform content recognition for the partial video, i.e., transmits the partial video to the image recognition device 20 to cause the image recognition device 20 to perform image recognition for the partial video (step S13, "content recognition" in FIG. 5).

The control unit 41 obtains an image recognition result from the image recognition device 20, to determine whether or not the content item (e.g., program or ad) to which the partial video belongs has been identified (step S14). When the content item has been identified (Yes in the step S14), the control unit 41 ends the image recognition for the content item to which the partial video belongs. On the other hand, when the content item has not been identified (No in the step S14), the control unit 41 repeats the processing (steps S10 to S13) on the next partial video. It should be noted that as an example of determination basis for identifying an content item, when the image recognition device 20 outputs the same image recognition result for a predetermined number of continuous partial videos, it may be determined that the content item to which these partial videos belong has been identified.

It should be noted that the above processing (steps S10 to S14) focuses on identifying one content item, and such content identification may be repeated. That is, although the identification is performed at the end of the above processing steps (step S14) on a per content item basis, this processing is not necessarily required and the image recognition for the partial videos which do not include the content switchover may be repeated irrespective of whether or not the content item has been identified. In this case, after the step S13, the processing may go back to the step S10 without determination in the step S14.

Figure 4B:
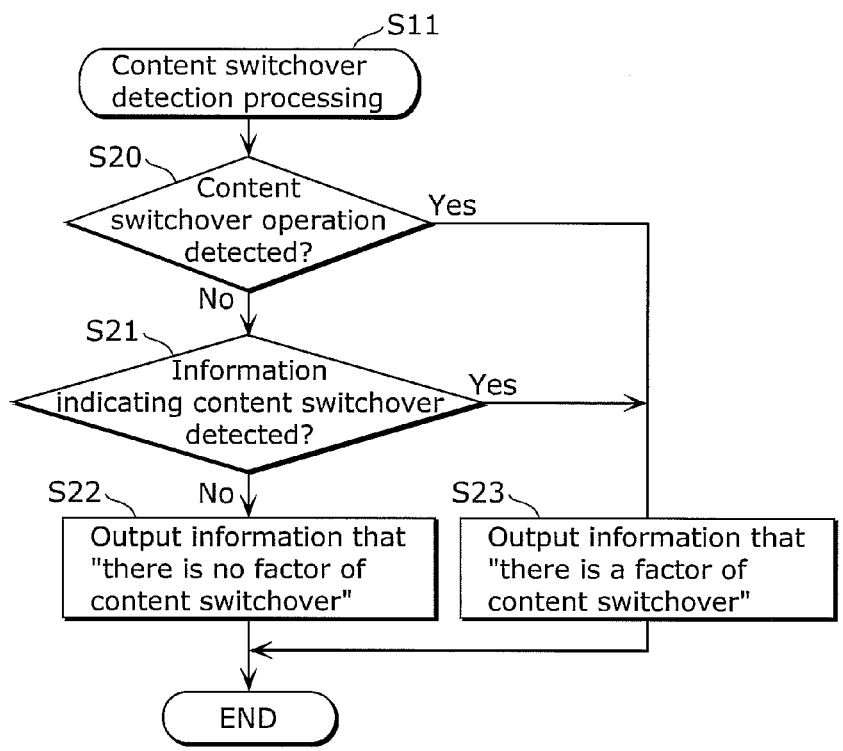
FIG. 4B is a flowchart illustrating the detailed procedure of content switchover detection (step S11) in FIG. 4A.

FIG. 4B is a flowchart illustrating the detailed procedure of the detection of content switchover in FIG. 4A (step S11).

In the detection of the content switchover (step S11), the content switchover detection unit 46 determines whether or not a content switchover operation has been detected (step S20, "detection of operation signal" in FIG. 5). Here, the content switchover operation means user's instruction for changing content items received by the video reception device 40 (i.e., operation signal received by the operation signal reception unit 43). It should be noted that a specific example of the content switchover operation will be described later.

As a result, when the content switchover operation has been detected (Yes in the step S20), the content switchover detection unit 46 outputs information indicating "there is a factor for the content switchover" to the control unit 41 (step S23). Thus, the control unit 41 is informed that the content switchover detection unit 46 has determined that a partial video includes the content switchover.

On the other hand, when the content switchover operation has not been detected (No in the step S20), the content switchover detection unit 46 subsequently determines whether or not information indicating the content switchover has been detected (step S21). Here, the content switchover detection unit 46 detects whether or not there is any change in the attribute of the content in a partial video extracted by the video extraction unit 45 to determine whether or not the information indicating the content switchover has been detected ("specific video" and "amount of change in video: large" in FIG. 5). It should be noted that a specific example of detection of the information indicating the content switchover will be described later.

As a result, when the information indicating the content switchover has been detected (Yes in the step S21), the content switchover detection unit 46 outputs the information indicating "there is a factor for the content switchover" to the control unit 41 (step S23).

On the other hand, when the information indicating the content switchover has not been detected (No in the step S21), the content switchover detection unit 46 outputs information indicating "there is no factor for the content switchover" to the control unit 41 (step S22). Thus, the control unit 41 is informed that the content switchover detection unit 46 has determined that the partial video does not include the content switchover.

Figure 4C:
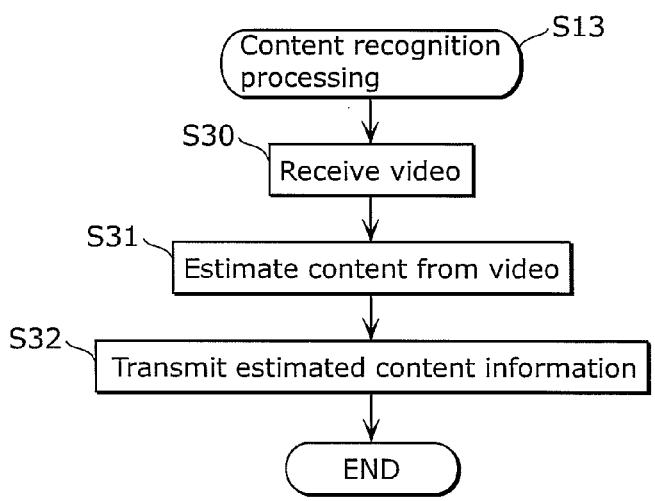
FIG. 4C is a flowchart illustrating the detailed procedure of the content recognition (step S13) in FIG. 4A.

FIG. 4C is a flowchart illustrating the detailed procedure of the content recognition (step S13) in FIG. 4A. Here, FIG. 4C illustrates the processing procedure for a partial video transmitted from the video reception device 40, by the image recognition device 20.

When receiving a partial video along with a request for the image recognition from the video reception device 40 (step S30), the image recognition device 20 estimates a content item (program or ad) to which the partial video belong, using the fingerprint matching, for example (step S31). That is, the content search unit 22 of the image recognition device 20 creates a fingerprint for the partial video received from the video reception device 40. The content search unit 22 makes a search by matching the fingerprint and a fingerprint stored in the content storage unit 23 to identify the content item to which the partial video belong. The content search unit 22 reads the analysis result associated with the identified content item from the content storage unit 23, as an image recognition result. For example, the content search unit 22 obtains the image recognition result that the received partial video is "ABC news program" and "the presenter is Mr. or Ms. DEF".

The content search unit 22 of the image recognition device 20 transmits the obtained image recognition result to the video reception device 40 via the HTTP transmit-receive unit 21 (step S32).

It should be noted that as a result of the image recognition, not only one image recognition result but also more than one image recognition result may be included. Likelihood (e.g., probability) for each of the image recognition results may be added. This allows the video reception device 40 which obtained such image recognition result to determine whether or not a content item to which a partial video belongs has been identified, from the likelihood included in the image recognition result. For example, when the image recognition result in which the recognition likelihood of more than 80% is given is included, it is possible to determine that the content item has been identified.

Figure 6:
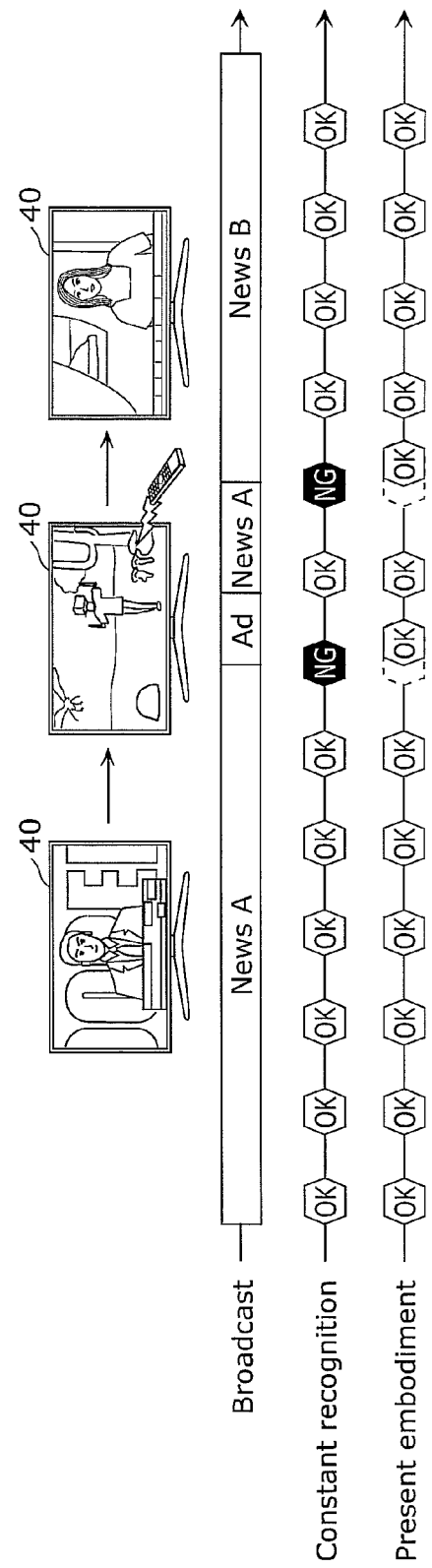
FIG. 6 illustrates the timing of the image recognition when selective image recognition was performed by the video reception device.

FIG. 6 illustrates the timing of the image recognition when the video reception device 40 performs selective image recognition in accordance with the above processing steps. In FIG. 6, "broadcast" represents broadcast content items switches of which occur as time elapses. "Constant recognition" represents image recognition results in the prior art in which the image recognition is constantly performed irrespective of whether or not the content switchover is included. The "present embodiment" represents the results of selective image recognition in the present embodiment in which the image recognition is performed when the content switchover is not included.

As shown in FIG. 6, when the "broadcast" content items are switched from "News A" to "Ad", and when the "broadcast" content items are switched from "News A" to "News B", the image recognition fails for the conventional "constant recognition". As a result, the image recognition for "Ad" immediately after "News A" is not performed.

On the other hand, for the "present embodiment", immediately after that the content switchover detection unit 46 detects such content switchover, the video extraction unit 45 re-extracts a new partial video without performing the image recognition for the partial video. When the re-extracted partial video does not include the content switchover, the image recognition is performed for the re-extracted partial video. Thus, when it is detected that the partial video includes the content switchover, unnecessary image recognition (failure of image recognition) is avoided, and the image recognition is performed for a subsequently re-extracted partial video including no content switchover. This allows for the image recognition for content items distributed after the content switchover at earlier timing. Therefore, in the example shown in FIG. 6, the image recognition is performed for "Ad" immediately after "News A".

Thus, according to the present embodiment, when it is detected that a partial video includes the content switchover, a new partial video is re-extracted without performing the image recognition for the partial video. This can avoid the failure of the image recognition due to the fact that at least two content items are included in a partial video, and allows for the image recognition for a content item distributed after the content switchover at earlier timing.

It should be noted that in the present embodiment, when it is determined that a partial video includes the content switchover, a new partial video is immediately re-extracted without waiting for a cycle determined by the recognition cycle determination unit 47. However, the re-extraction may be performed in accordance with the cycle. Even in this case, the image recognition for a partial video including the content switchover is not performed. Therefore, unnecessary processing due to the failure of the image recognition can be avoided.

Figure 7:
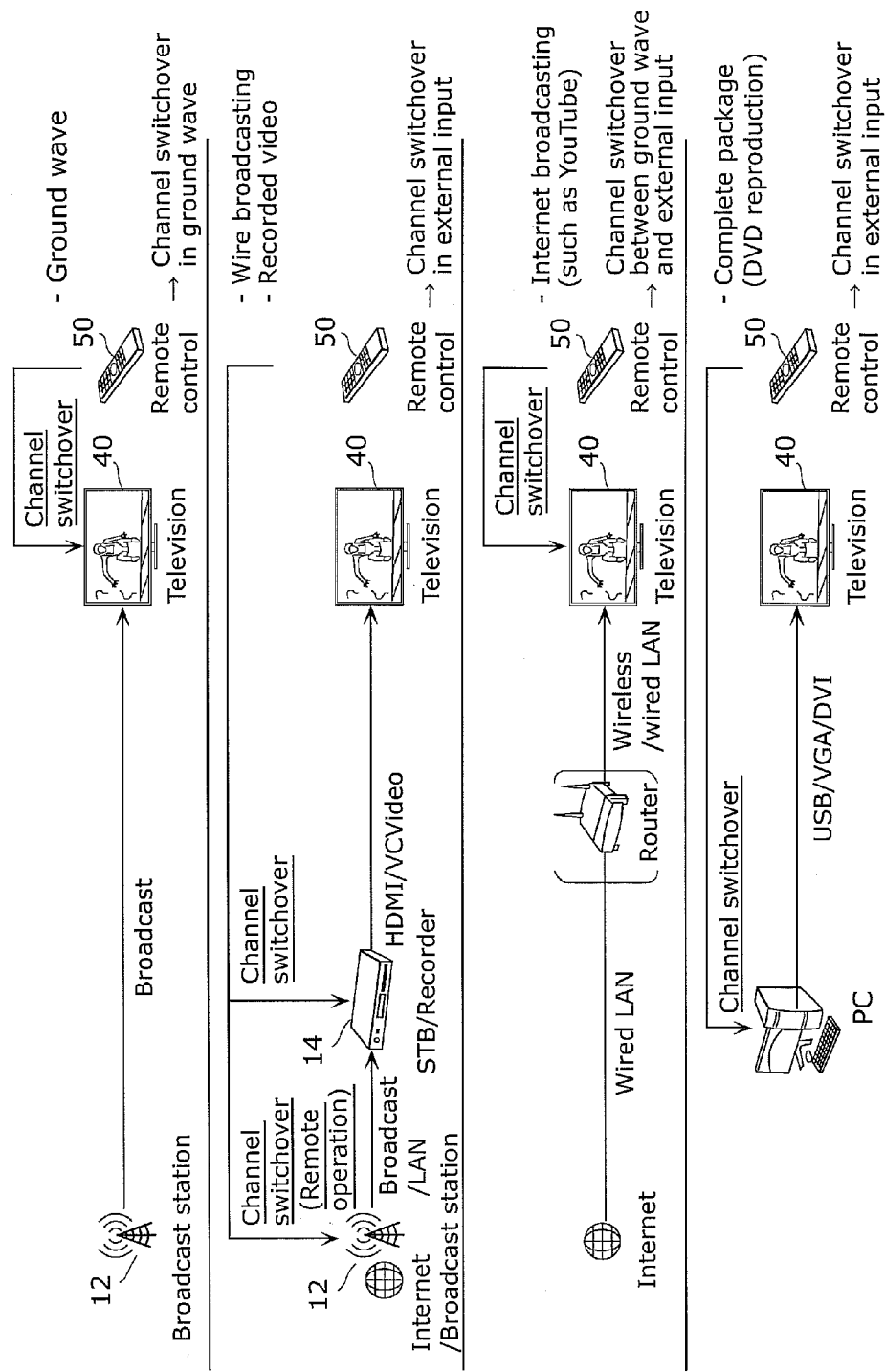
FIG. 7 is a figure to explain the overview of detection by a content switchover detection unit of the video reception device.

FIG. 7 is a figure to explain the overview of detection by the content switchover detection unit 46.

FIG. 7 shows various cases of the content switchover which can be caused by the operation of a remote control 50. For example, as shown in the top section in FIG. 7, when the video reception device 40 receives a ground wave from the broadcast station 12, channels are changed within the ground wave by the remote control 50. The video reception device 40 can detect operation signals from the remote control 50 and determine that there is the content switchover. Moreover, as shown in the second section in FIG. 7, when the video reception device 40 receives more than one video signal from the broadcast station 12, the STB 14, and others via a communication medium such as HDMI (registered trademark), the video reception device 40 cannot detect operation signals from the remote control 50 to the STB and others, and thus it is necessary to perform detection of the content switchover by video detection. Moreover, as shown in the third section in FIG. 7, when the video reception device 40 receives video signals from the Internet, channels are changed by the video reception device 40 receiving external input video signals changed by the remote control 50, and the video reception device 40 can detect operation signals from the remote control 50 and determine that there is the content switchover. Furthermore, as shown in the bottom section in FIG. 7, when receiving video signals from a personal computer (PC), the video reception device 40 cannot detect operation signals from the remote control 50 to the PC, and it is necessary to perform detection of the content switchover by video detection.

Thus, as shown in FIG. 7, according to a path through which a video displayed by the video reception device 40 is obtained, it is necessary to determine whether the content switchover is performed by the detection of operation signals or the video detection.

FIG. 8 is a figure to categorize detection methods in terms of (i) a path for obtaining video signals before the content switchover by the content switchover detection unit 46 and (ii) a path for obtaining video signals after the content switchover by the content switchover detection unit 46.

Here, FIG. 8 is a table illustrating perspectives when the content switchover detection unit 46 detects whether or not a partial video includes the content switchover. More specifically, the rows and columns in the table show six video sources (content items) in total of programs and ads included in three input videos: (i) a "ground wave" received by the video reception unit 49a, (ii) an "external input 1" which is a video received by the first external input unit 49b, and (iii) an "external input 2" which is a video received by the second external input unit 49c. In addition, the table shows the detectability of "operation detection" by the content switchover detection unit 46 and the necessity of "video detection", for all cases of possible combinations (of each row and each column) before and after the content switchover, i.e., 36 cells in FIG. 8. Here, the "operation detection" corresponds to the detection of the content switchover operation in FIG. 4B (step S20), and is specifically to detect that a partial video includes the content switchover from user's instruction for switching content items received by the video reception device 40 (i.e., operation signal received by the operation signal reception unit 43). Moreover, the "video detection" corresponds to the detection of information indicating the content switchover in FIG. 4B (step S21), and is specifically to detect whether there is a change in the attribute of the content in the partial video extracted by the video extraction unit 45 to detect whether the partial video includes the content switchover.

For example, in FIG. 8, the cell where (i) the row in which a "ground wave" "program" is recited and (ii) the column in which a "ground wave" "program" is recited meet corresponds to the case of switchover from one ground wave program to another ground wave program. As this cell recites "operation detection: detectable" and "video detection: unnecessary", in this case, it is detected only by the operation detection by the content switchover detection unit 46 that the partial video includes the content switchover. Moreover, in FIG. 8, the cell where (i) the row in which a "ground wave" "ad" is recited and (ii) the column in which a "ground wave" "ad" is recited meet corresponds to the case of switchover from one ground wave ad to another ground wave ad. As this cell recites "operation detection: undetectable" and "video detection: necessary", in this case, it is detected only by the video detection by the content switchover detection unit 46 that the partial video includes the content switchover.

Thus, as is clear from the table shown in FIG. 8, the operation detection and the video detection by the content switchover detection unit 46 can detect switchover between video sources (content items) of various kinds.

FIG. 9 is a figure to explain the specific content of the detection method by the content switchover detection unit 46.

Here, FIG. 9 is a table illustrating information based on when the content switchover detection unit 46 detects the content switchover in a partial video. Specifically, FIG. 9 illustrates "detection method" and "detection target" for each "factor of the content switchover".

Here, "content switchover in broadcasting (network) such as switchover of program(s)/ad(s)" in the "factor of content switchover" is the case where the content switchover is caused although no operation is performed for the video reception device 40 (there is no change in operation signals).

For example, the case where a channel switchover operation is performed on the STB14 which is an external tuner connected to the video reception device 40 corresponds to the above case. In this case, the content switchover is caused although no operation is performed for the video reception device 40 (there is no change in operation signals).

Moreover, "content switchover (between networks) by broadcast switching such as remote control operation" in the "factor of content switchover" is the case where the content switchover is caused by the switchover of video inputs which is inputted to the video reception device 40. For example, the case where there has been a switchover between three types of video signal inputs (inputs to the video reception unit 49a, the first external input unit 49b, and the second external input unit 49c) in the video input unit 49 corresponds to the above case.

As shown in FIG. 9, for the case where the "factor of content switchover" is the "content switchover in broadcasting (network) such as switchover of program(s)/ad(s)", the content switchover detection unit 46 detects "change in content attribute", i.e., detects whether or not there is a change in the attribute of content in a partial video to detect whether or not the partial video includes the content switchover. Here, as shown in FIG. 9, the detection of the "change in content attribute" includes detection by "use of program meta-information", the detection of "change in signal attribute information", and the detection of "change in attribute of video and audio". Specific detection targets for detections are as recited in "detection target" in FIG. 9.

That is, when there is a change in a content attribute in a partial video, the content switchover detection unit 46 detects that the partial video includes the content switchover. The content attribute may be (i) indicated by the program meta-information including the details of the program to which the partial video received by the video input unit belongs (such as EPG information stored in the additional information storage unit 48), (ii) indicated by the signal attribute information which is information on the copyright protection for a video received by the video input unit 49 (such as information on copyright and free/charge), or (iii) an attribute as a video signal or an audio signal received by the video input unit 49 (such as image resolution and the number of audio channels).

Moreover, for the case where the "factor of content switchover" is the "content switchover in broadcasting (network) such as switchover of program(s)/ad(s)", the content switchover detection unit 46 detects whether or not a partial video includes the content switchover by "detection of switching signal" and "detection of specific content". Here, the "detection of switching signal" corresponds to the "operation detection" in FIG. 8 and the detection of content switchover operation in FIG. 4B (step S20). Specifically, the "detection of switching signal" is to detect that a partial video includes the content switchover from user's instruction for switching content items received by the video reception device 40 (i.e., operation signal received by the operation signal reception unit 43) (cf. "detection of operation information" and its "detection target" in FIG. 9). Moreover, the "detection of specific content" is to detect that the partial video includes the content switchover by detecting a content item (i.e., specific content) for which the content switchover can be detected from a video signal itself rather than an operation signal (cf. "detection of presence of source" and its "detection target" in FIG. 9).

That is, when content items in the partial video are changed by an operation signal received by the operation signal reception unit 43, the content switchover detection unit 46 may detect that the partial video includes the content switchover ("detection of operation information" in FIG. 9). Alternatively, for example, when a state in which the partial video does not include a content item is caused by the operation signal received by the operation signal reception unit 43 ("video black mute" and "audio mute" in "detection of presence of source" in FIG. 9), the content switchover detection unit 46 may detect that the partial video includes the content switchover.

Thus, as is clear from the table shown in FIG. 9, it is detected that the partial video includes the content switchover, based on at least one of the operation detection and video detection by the content switchover detection unit 46.

Thus, the video reception device 40 in the present embodiment causes the image recognition device 20 to perform the image recognition only for the partial video for which it has been detected that the content switchover is not included. This avoids (i) the failure of the image recognition due to the fact that at least two content items are included in a partial video and (ii) unnecessary processing in the video reception device 40.

(2) Adjustment Operation for Image Recognition Cycle

The following describes the adjustment operation for an image recognition cycle by the video reception device 40 in the content recognition system 10.

Figure 10A:
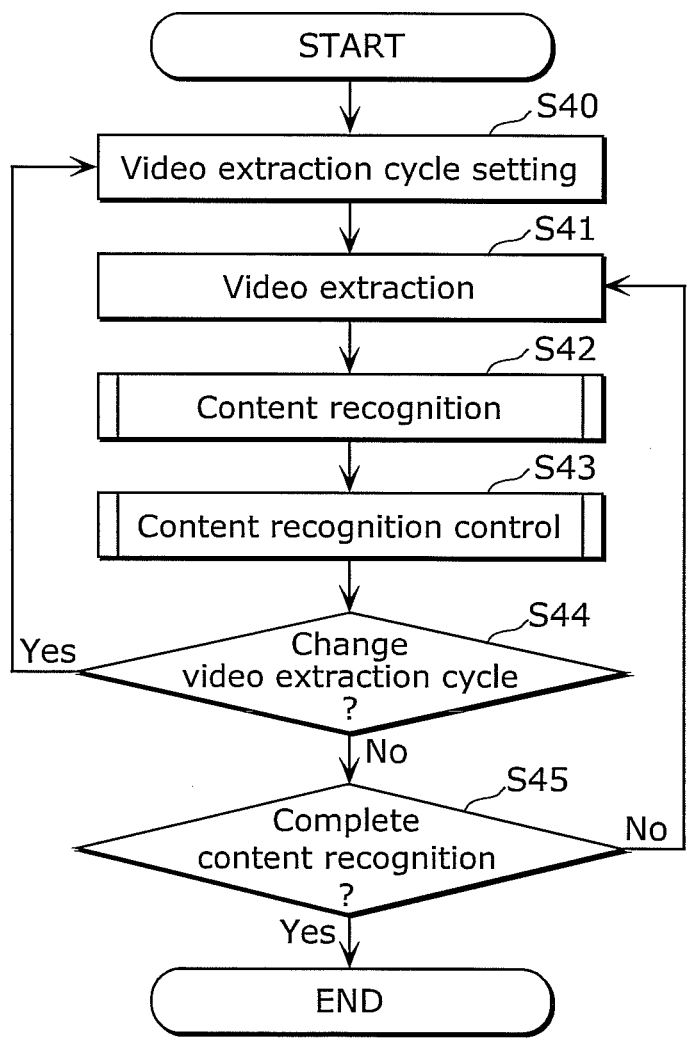
FIG. 10A is a flowchart illustrating the procedure of adjustment operation for an image recognition cycle by the video reception device.

FIG. 10A is a flowchart indicating a procedure in the adjustment operation for the image recognition cycle by the video reception device 40 in the content recognition system 10.

The recognition cycle determination unit 47 determines a cycle for repeating the image recognition for a video received by the video input unit 49 (step S40).

The video extraction unit 45 extracts a partial video from the video received by the video input unit 49 at the cycle determined in the step S40 (step S41).

The control unit 41 causes the image recognition device 20 to perform content recognition processing (step S42). That is, the control unit 41 transmits to the image recognition device 20, information on a partial video extracted by the video extraction unit 45 in the step S41, and causes the image recognition device 20 to perform the image recognition for the partial video to obtain its result. The details of the content recognition processing will be described later.

The recognition cycle determination unit 47 performs content recognition control processing (step S43). The recognition cycle determination unit 47 changes or maintains a video extraction cycle according to the content recognition result in the step S42. The details of the content recognition control processing will be described later.

The recognition cycle determination unit 47 determines whether to change the video extraction cycle based on the result of the content recognition control processing in the step S43 (step S44). As a result of the determination in the step S44, when it is determined that the video extraction cycle is changed (Yes in the step S44), the processing goes back to the step S40, and a series of processing steps subsequent to the step S41 is performed based on the video extraction cycle after the change.

On the other hand, as a result of the determination in the step S44, when it is determined that the video extraction cycle is maintained (is not changed) (No in the step S44), the control unit 41 determines whether to end content recognition (step S45). As a result of the determination in the step S45, when it is determined that the content recognition does not end (the content recognition is continued), the processing goes back to the step S41. On the other hand, as a result of the determination in the step S45, when it is determined that the content recognition ends, the series of processing ends.

Figure 10B:
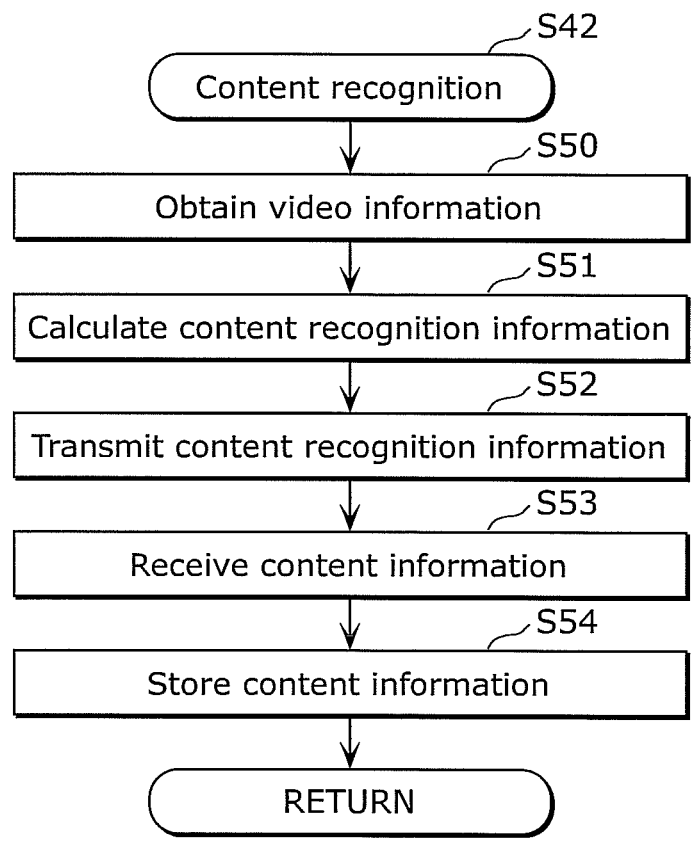
FIG. 10B is a flowchart illustrating the detailed procedure of the content recognition (step S42) in FIG. 10A.

FIG. 10B is a flowchart illustrating the detailed procedure of the content recognition in FIG. 10A (step S42).

In the content recognition processing, the control unit 41 obtains video information on a partial video extracted by the video extraction unit 45 (step S50).

The control unit 41 calculates content recognition information on the video information obtained in the step S50 (step S51). The content recognition information is information obtained by compressing or encrypting the partial video to cause the image recognition device 20 to recognize the partial video, and is equivalent to a fingerprint.

The control unit 41 transmits the content recognition information calculated in the step S51 to the image recognition device 20 via a network 16 (step S52).

The control unit 41 receives content information which is a result obtained by the image recognition device 20 recognizing the content recognition information transmitted in the step S52 (step S53).

The control unit 41 stores the content information received in the step S53 in a memory (not shown) (step S54). It should be noted that the control unit 41 may cause the additional information storage unit 48 to store the content information.

Figure 10C:
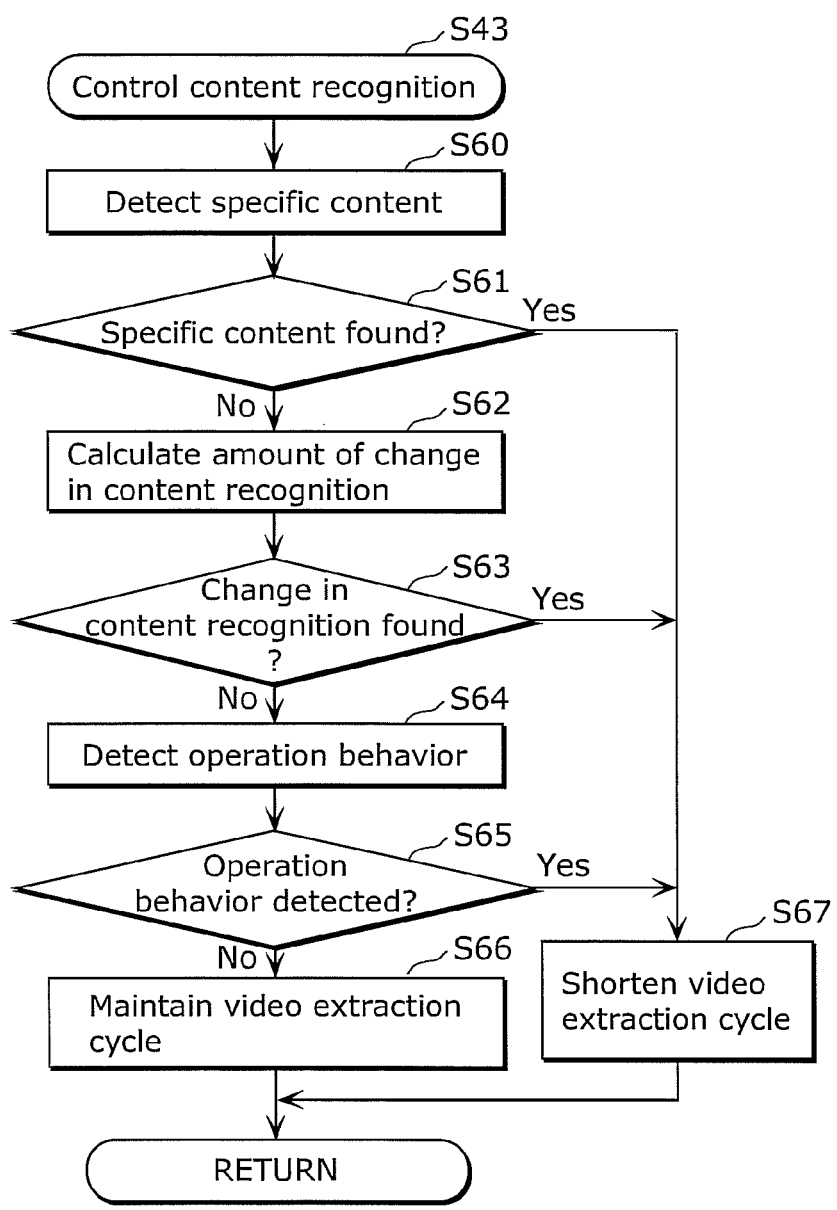
FIG. 10C is a flowchart illustrating the detailed procedure of the content recognition control (step S43) in FIG. 10A.
Figure 11:
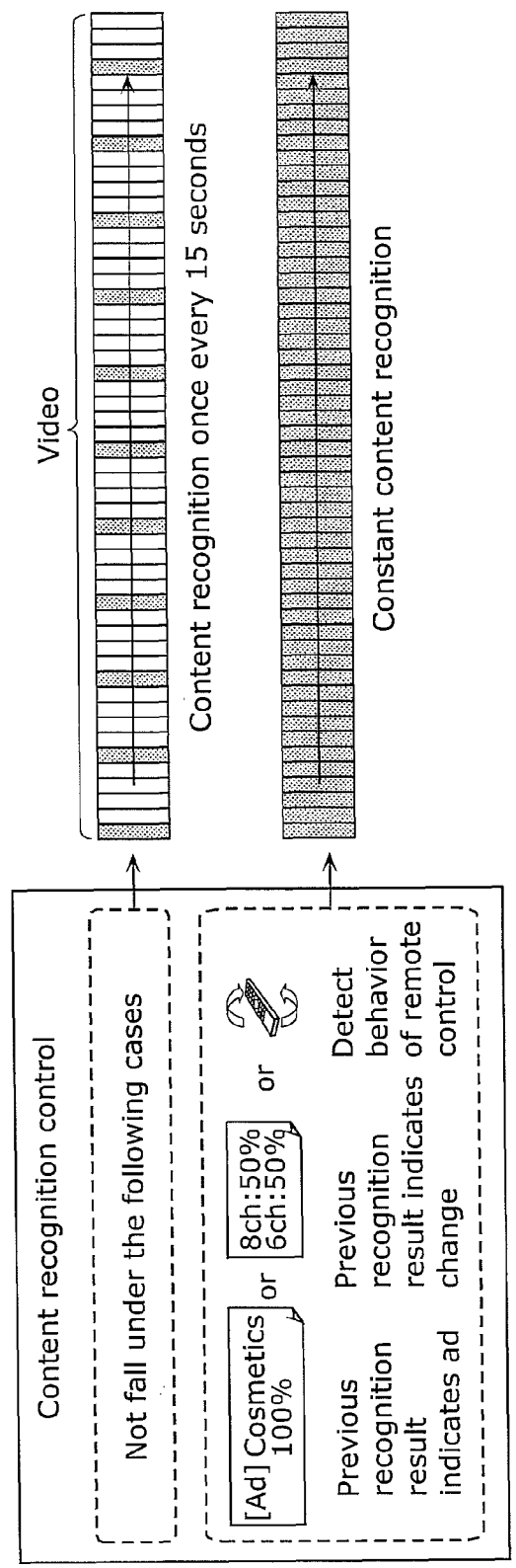
FIG. 11 is a figure to explain the overview of an adjustment operation for an image recognition cycle by the video reception device.

FIG. 10C is a flowchart illustrating the detailed procedure of the content recognition control in FIG. 10A (step S43). FIG. 11 is a figure to explain the overview of the adjustment operation for an image recognition cycle by the video reception device 40.

In the content recognition control processing, the recognition cycle determination unit 47 detects specific content from a result of the content recognition processing in the step S42 (step S60). Here, the specific content is a content item which may be switched over to another content item as time elapses with a high possibility or a content item known as a content item which continues for a short cycle of time (e.g., ad). The recognition cycle determination unit 47 detects the specific content from the partial video on which the content recognition processing has been performed, based on the result of the content recognition processing in the step S42.

The recognition cycle determination unit 47 determines whether or not the specific content has been detected in the step S60 (step S61). As a result, when the specific content has been detected (Yes in the step S61), it is determined that a video extraction cycle is changed (step S67), and the content recognition control processing ends. When the processing ends here, in the subsequent processing step S44, it is determined that the video extraction cycle is shortened.

On the other hand, when the specific content has not been detected (No in the step S61), the recognition cycle determination unit 47 calculates the amount of change in content recognition (step S62). The amount of change in the content recognition is an amount indicating the degree of change in results of the content recognition processing in the step S42. For example, when the content recognition result is associated with a viewing channel using a probability, the probability corresponds to the amount of change in content recognition. Specifically, when Channel 6 and Channel 8 broadcast the same ad at the same time, the content recognition result for the partial video may be "Channel 6: 50% and Channel 8: 50%". This may occur when the content item is recognized as Channel 6 or Channel 8 from the partial video but it is not possible to identify the content item is Channel 6 or Channel 8. Moreover, unlike the above case, this may occur when a time portion corresponding to 50% of the partial video corresponds to Channel 6, and a time portion corresponding to the other 50% of the partial video corresponds to Channel 8.

The recognition cycle determination unit 47 determines whether or not there is a change in content recognition, based on the amount of change in content recognition calculated in the step S62 (step S63). The recognition cycle determination unit 47 compares a content recognition result for the partial video and a previous content recognition result for the partial video to determine whether or not there is change in the content recognition results. Specifically, when the previous content recognition result for the partial video is "Channel 6: 100%", and the content recognition result for the partial video is "Channel 6: 50% and Channel 8: 50%", the recognition cycle determination unit 47 determines that there is a change in the content recognition results. As a result of the determination in the step S63, when the recognition cycle determination unit 47 determines that there is a change in the content recognition results (Yes in the step S63), it is determined that the video extraction cycle is changed (step S67), and the content recognition control processing ends. When the processing ends here, in the subsequent processing step S44, it is determined that the video extraction cycle is shortened.

On the other hand, as a result of the determination in the step S63, when the recognition cycle determination unit 47 determines that there is no change in the content recognition results (No in the step S63), the recognition cycle determination unit 47 detects an operation behavior (step S64). The operation behavior is, for example, a user operation using the remote control of the video reception device 40 or a physical behavior of the remote control or the like. The user operation using the remote control of the video reception device 40 includes the switchover of channels, the volume, and video sources in the video reception device 40. Moreover, the physical behavior of the remote control or the like is a physical behavior of the remote control or the like detected by a gyro censor installed in the remote control or the like, and a behavior when the user holds or operates the remote control. The operation behavior is received by the operation signal reception unit 43. It should be noted that rather than that all of the behaviors detected by the gyro censor are recognized as the physical behaviors of the remote control, only the behaviors which are greater than a predetermined threshold may be recognized as the behaviors of the remote control. This can prevent the detection of small behaviors of the remote control and improve the accuracy of detecting a user operation.

When the recognition cycle determination unit 47 detects the operation behavior in the step S64 (Yes in the step S65), it is determined that the video extraction cycle is changed (step S67), and the content recognition control processing ends. When the processing ends here, in the subsequent processing step S44, it is determined that the video extraction cycle is shortened.

On the other hand, when the recognition cycle determination unit 47 does not detect the operation behavior in the step S64 (No in the step S65), it is determined that the video extraction cycle is maintained (step S66), and the content recognition control processing ends. When the processing ends here, in the subsequent processing step S44, it is determined that the video extraction cycle is maintained (not changed) or extended.

In the content recognition control processing step S43 described above, when (i) a specific content item is detected in a partial video, (ii) there is a change in content recognition, or (iii) an operation behavior is detected, the video extraction cycle can be shortened in the subsequent step S44. For any one of the above cases, it is determined that there is a possibility that there is a change in content recognition results between (i) the partial video on which the content recognition processing has been performed and (ii) the next partial video. In such a case, the video extraction cycle is shortened for performing the next content recognition at earlier timing, so that a content recognition result can follow the change in content items ("Constant content recognition in FIG. 11").

On the other hand, for a case which is none of the cases described above, the video extraction cycle can be maintained (not changed) or is extended in the subsequent step S44. In this case, it is determined that there is no possibility that there is a change in content recognition results between (i) the partial video on which the content recognition processing has been performed and (ii) the next partial video. In such a case, it is possible to reduce the processing load of the video reception device 40 by maintaining (not changing) the video extraction cycle to set a longer time interval until the next content recognition. It should be noted that in such a case, it is possible to significantly reduce the processing load of the video reception device 40 by extending the video extraction cycle ("content recognition once every 15 seconds" in FIG. 11).

Thus, the video reception device 40 in the present embodiment determines a possibility of the content switchover which is switchover of content items has been or will be found in a received video. When the video reception device 40 determines that there is the possibility, an image recognition cycle is shortened. On the other hand, when the video reception device 40 determines that there is no such possibility, the image recognition cycle is extended. This not only reduces the processing load of the video reception device 40 when performing the image recognition, but also increases the possibility that the timing of the image recognition is automatically adjusted and the image recognition is performed for each content item.

As mentioned above, the video reception device in the present embodiment is a video reception device connected to an image recognition device for performing image recognition. The video reception device includes: a video input unit that receives a video including content items switches of which occur as time elapses; a video extraction unit that extracts from the video a partial video which is a portion of the video; a content switchover detection unit that detects whether or not the partial video includes content switchover indicating switchover of the content items; and a control unit that performs, when the content switchover detection unit detects that the partial video includes no content switchover, a control to output the partial video to the image recognition device to obtain a result of the image recognition for the partial video from the image recognition device.

This allows the video reception device to cause the image recognition device to perform the image recognition only for a partial video for which it has been detected that the content switchover is not included. This avoids (i) the failure of the image recognition due to the fact that at least two content items are included in a partial video and (ii) unnecessary processing in the video reception device. Therefore, even when content items in a received video change, content recognition is performed more reliably.

Moreover, in the present embodiment, the video extraction unit repeatedly extracts a new partial video from the video, the content switchover detection unit performs the detection every time the video extraction unit extracts the partial video, and the control unit performs the control every time the content switchover detection unit performs the detection, and when the content switchover detection unit detects that the partial video includes the content switchover, the control unit, without outputting the partial video to the image recognition device, causes the video extraction unit to extract a new partial video.

When it is detected that the partial video includes the content switchover, the video reception device causes the image recognition device to perform the image recognition for a new partial video for which it has been detected that the content switchover is not included. Assuming that the video extraction is performed periodically, when it is detected that the partial video includes the content switchover, it is necessary to wait for a content recognition result until video extraction of the next cycle. Meanwhile, the video reception device in the present embodiment can cause the image recognition device to perform the image recognition without waiting for a content recognition result until video extraction of the next cycle.

Moreover, in the present embodiment, the content switchover detection unit performs the detection based on at least one of an attribute of content of the partial video and an instruction from a user.

Thus, the video reception device detects whether or not the partial video includes the content switchover, based on at least one of an content attribute or an instruction from a user. Before and after the content switchover, there is a change in the content attribute. Moreover, content items are changed by the instruction from the user. Therefore, the video reception device can detect the content switchover more accurately by detecting based on theses.

Moreover, in the present embodiment, the content switchover detection unit detects that the partial video includes the content switchover when there is a change in the attribute of the content of the partial video. Specifically, the attribute of the content is represented by program meta-information including details of a program to which the partial video received by the video input unit belongs. Moreover, the attribute of the content is represented by signal attribute information which is information on copyright protection for the video received by the video input unit. Moreover, the attribute of the content is an attribute of a video signal or an audio signal received by the video input unit.

This allows the video reception device to detect the content switchover from a change in the program meta-information, a change in the signal attribute information, or a change in an attribute as a video signal or an audio signal.

Moreover, in the present embodiment, the video reception device further includes an operation signal reception unit that receives an operation signal indicating a user operation, in which when content items in the partial video have been changed by the operation signal received by the operation signal reception unit, the content switchover detection unit detects that the partial video includes the content switchover. Moreover, the video reception device further includes an operation signal reception unit that receives an operation signal indicating a user operation, in which when a state in which the partial video includes no content item is caused by the operation signal received by the operation signal reception unit, the content switchover detection unit detects that the partial video includes the content switchover.

This allows the video reception device to detect the content switchover from user operation or a change in a video state which is caused by the operation, for example.

Moreover, in the present embodiment, the video reception device is connected to a communication device, and further includes a display screen, in which when obtaining a result of the image recognition from the image recognition device, the control unit obtains, from the communication device, related information which is information related to the result of the image recognition, to display the related information on the display screen.

Thus, the video reception device allows a user to see information relating to the image recognition result through the display screen.

Moreover, an image recognition method for a received video in the present embodiment is an image recognition method for a video received by a video reception device connected to an image recognition device for performing image recognition. The method includes: receiving the video including content items switches of which occur as time elapses; extracting from the video a partial video which is a portion of the video; detecting whether or not the partial video includes content switchover indicating switchover of the content items; and performing a control to output the partial video to the image recognition device to obtain a result of the image recognition for the partial video from the image recognition device when the content switchover detection unit detects that the partial video includes no content switchover.

This provides the same advantages given by the video reception device.

The video reception devices and the image recognition methods in the present disclosure were described based on the embodiment. However, the present disclosure is not limited to this embodiment. Those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The video reception devices in the present disclosure can be used as a video reception device which outputs a received video to an external image recognition device to obtain an image recognition result, such as a TV for displaying in real time a video and information on a related ad or the like using image recognition.

The invention claimed is:

1. A video reception device connected to an image recognition device for performing image recognition, the video reception device comprising:
a video input unit configured to receive a video including content items switches of which occur as time elapses;
a video extraction unit configured to extract from the video a partial video which is a portion of the video, the partial video having a predetermined time length;
a content switchover detection unit configured to detect whether or not the partial video includes content switchover indicating switchover of the content items; and
a control unit configured to perform, when the content switchover detection unit detects that the partial video includes no content switchover, a control to output the partial video to the image recognition device to obtain a result of the image recognition for the partial video from the image recognition device,
wherein the video extraction unit is configured to repeatedly extract a new partial video from the video,
the content switchover detection unit is configured to perform the detection every time the video extraction unit extracts the partial video, and
the control unit is configured to perform the control every time the content switchover detection unit performs the detection, and when the content switchover detection unit detects that the partial video includes the content switchover, the control unit is configured to, without outputting the partial video to the image recognition device, cause the video extraction unit to extract a new partial video.

2. The video reception device according to claim 1, further comprising
an operation signal reception unit configured to receive an operation signal indicating a user operation,
wherein when content items in the partial video have been changed by the operation signal received by the operation signal reception unit, the content switchover detection unit is configured to detect that the partial video includes the content switchover.

3. The video reception device according to claim 1, further comprising
an operation signal reception unit configured to receive an operation signal indicating a user operation,
wherein when a state in which the partial video includes no content item is caused by the operation signal received by the operation signal reception unit, the content switchover detection unit is configured to detect that the partial video includes the content switchover.

4. The video reception device according to claim 1,
the video reception device being connected to a communication device, and further comprising a display screen,
wherein when obtaining a result of the image recognition from the image recognition device, the control unit is configured to obtain, from the communication device, related information which is information related to the result of the image recognition, to display the related information on the display screen.

5. A video reception device connected to an image recognition device for performing image recognition, the video reception device comprising:
a video input unit configured to receive a video including content items switches of which occur as time elapses;
a video extraction unit configured to extract from the video a partial video which is a portion of the video, the partial video having a predetermined time length;
a content switchover detection unit configured to detect whether or not the partial video includes content switchover indicating switchover of the content items; and
a control unit configured to perform, when the content switchover detection unit detects that the partial video includes no content switchover, a control to output the partial video to the image recognition device to obtain a result of the image recognition for the partial video from the image recognition device,
wherein the content switchover detection unit is configured to perform the detection based on at least one of an attribute of content of the partial video and an instruction from a user, and
wherein the content switchover detection unit is configured to detect that the partial video includes the content switchover when there is a change in the attribute of the content of the partial video.

6. The video reception device according to claim 5,
wherein the attribute of the content is represented by program meta-information including details of a program to which the partial video received by the video input unit belongs.

7. The video reception device according to claim 5,
wherein the attribute of the content is represented by signal attribute information which is information on copyright protection for the video received by the video input unit.

8. The video reception device according to claim 5,
wherein the attribute of the content is an attribute of a video signal or an audio signal received by the video input unit.

9. An image recognition method for a video received by a video reception device connected to an image recognition device for performing image recognition, the method comprising:
receiving the video including content items switches of which occur as time elapses;
extracting from the video a partial video which is a portion of the video, the partial video having a predetermined time length;
detecting whether or not the partial video includes content switchover indicating switchover of the content items; and
performing a control to output the partial video to the image recognition device to obtain a result of the image recognition for the partial video from the image recognition device when it is determined in said detecting that the partial video includes no content switchover,
wherein said extracting comprises repeatedly extracting a new partial video from the video,
said detecting is performed every time the partial video is extracted in said extracting, and
said performing takes place every time said detecting is performed, and said performing further comprises performing a control to cause a new partial video to be extracted in said extracting without outputting the partial video to the image recognition device when it is determined in said detecting that the partial video includes the content switchover.

* * * * *